(12) United States Patent
Yu et al.

(10) Patent No.: US 12,202,680 B1
(45) Date of Patent: Jan. 21, 2025

(54) CLAMPING DEVICE HAVING AUTOMATIC DIRECTION ADJUSTMENT FUNCTION IN VEHICLE BODY WELDING CONVEYING LINE

(71) Applicant: Jilin University, Jilin (CN)

(72) Inventors: Zhenglei Yu, Jilin (CN); Bo Liu, Jilin (CN); Yiwen Zhang, Jilin (CN); Long Ma, Jilin (CN); Lidong Gu, Jilin (CN); Lei Dong, Jilin (CN); Shouxin Ruan, Jilin (CN); Xin Li, Jilin (CN); Zezhou Xu, Jilin (CN); Yunting Guo, Jilin (CN); Linsen Song, Jilin (CN); Jingru Liu, Jilin (CN); Zhouyuan Liu, Jilin (CN)

(73) Assignee: Jilin University, Changchun (CN)

( * ) Notice: Subject to any disclaimer, the term of this patent is extended or adjusted under 35 U.S.C. 154(b) by 0 days.

(21) Appl. No.: 18/884,304

(22) Filed: Sep. 13, 2024

(30) Foreign Application Priority Data

Oct. 10, 2023 (CN) .......................... 202311301903.9

(51) Int. Cl.
*B65G 43/08* (2006.01)
*B65G 47/90* (2006.01)

(52) U.S. Cl.
CPC .......... *B65G 43/08* (2013.01); *B65G 47/905* (2013.01); *B65G 2201/0294* (2013.01); *B65G 2203/044* (2013.01)

(58) Field of Classification Search
CPC .. B23K 37/047; B23K 37/04; B23K 37/0435; B65G 7/00
See application file for complete search history.

(56) References Cited

U.S. PATENT DOCUMENTS

2020/0316728 A1* 10/2020 Durand .............. B23K 37/0211

FOREIGN PATENT DOCUMENTS

| CN | 113953750 | * | 1/2022 |
|----|-----------|---|--------|
| CN | 218168512 U | | 12/2022 |
| CN | 115783341 A | | 3/2023 |
| CN | 115892937 A | | 4/2023 |
| CN | 115947130 A | | 4/2023 |
| DE | 4438502 C1 | | 2/1996 |
| KR | 101972790 B1 | | 4/2019 |
| WO | WO2021042780 | * | 3/2021 |

* cited by examiner

*Primary Examiner* — Gene O Crawford
*Assistant Examiner* — Lester Rushin, III

(57) ABSTRACT

Disclosed is a clamping device having an automatic direction adjustment function in a vehicle body welding conveying line, including a conveying frame. A driving motor is fixedly connected to a side wall of the conveying frame, and an output shaft end of the driving motor is fixedly connected to a rotating shaft I. The present disclosure facilitates the adjustment of a direction when vehicle bodies to be welded are conveyed on a turning conveying line, and vehicle bodies being conveyed can be corrected to the same horizontal state, to avoid a situation where the clamping device on the conveying line cannot smoothly clamp inclined vehicle bodies for conveying because the vehicle bodies cannot be in the same horizontal plane when being put in.

9 Claims, 10 Drawing Sheets

CLAMPING DEVICE HAVING AUTOMATIC DIRECTION ADJUSTMENT FUNCTION IN VEHICLE BODY WELDING CONVEYING LINE

CROSS-REFERENCE TO RELATED APPLICATION

This application claims priority of Chinese Patent Application No. 202311301903.9, filed on Oct. 10, 2023, the entire contents of which are incorporated herein by reference.

TECHNICAL FIELD

The present disclosure relates to the technical field of welding processing, and in particular to a clamping device having an automatic direction adjustment function in a vehicle body welding conveying line.

BACKGROUND

In a vehicle body welding production line, a vehicle body welding conveying line, an important part of the welding production line, is a device to transfer parts among work stations, and a very important production link in an automobile manufacturing process. Since an automobile manufacturing working interval contains a plurality of steps, and operating line processes thereof include welding, stamping, coating, power assembly, etc., all of which being included in a working interval. In order to save space, the vehicle body welding conveying line usually uses a conveying mode with a bending angle to change a conveying track of vehicle bodies. However, when the vehicle bodies are conveyed on some curved conveying lines, a direction of the vehicle body usually does not change when passing through a turn of the conveying line, and only a conveying direction changes. Therefore, an initial placing state of the vehicle body usually does not comply with a position of welding placement after turning conveying, a direction of the vehicle body during turning cannot be adjusted, and a standard direction required for welding the vehicle body cannot be reached.

In addition, when the vehicle body is manually put into an upper part of the conveying line, it is impossible to accurately determine whether the vehicle body is placed on the same horizontal line due to the manual operation, and as the vehicle body continues to be conveyed, the vehicle body originally placed obliquely will continue to deviate, and will not be smoothly conveyed to a next conveying direction of the curved conveying line.

In view of this, the present disclosure provides a clamping device having an automatic direction adjustment function in a vehicle body welding conveying line.

SUMMARY

In response to the deficiencies of the prior art, the present disclosure solves the problems set forth in the background above by providing a clamping device having an automatic direction adjustment function in a vehicle body welding conveying line.

In order to achieve the above objective, the present disclosure provides the following technical solutions. A clamping device having an automatic direction adjustment function in a vehicle body welding conveying line includes a conveying frame. A driving motor is fixedly connected to a side wall of the conveying frame, and rotating shafts I are rotatably connected to an inner wall of the conveying frame uniformly, an output shaft end of the driving motor being fixedly connected to the rotating shaft I; and a conveyor belt I is connected to outer walls of the rotating shafts I in a transmission way, and rotating shafts II are rotatably connected to the inner wall of the conveying frame uniformly, a conveyor belt II being connected to outer walls of the rotating shafts II in a transmission way; and a direction self-adjustment assembly is mounted on the conveying frame, and a vehicle body correcting assembly is mounted on the conveying frame; and the direction self-adjustment assembly includes a mounting frame, a control module, an electric telescopic rod, a sliding plate, a supporting shaft, a cylinder jaw mechanism, a protrusive plate, a sliding wheel, a chute frame, an infrared sensor, a worm gear, a turning wheel I, a worm rod and a turning wheel II; an upper part of the conveying frame is fixedly connected to the mounting frame, an upper part of the mounting frame is fixedly mounted with the control module, and the electric telescopic rod is fixedly connected to an interior of a groove at a lower part of the mounting frame; one end of the electric telescopic rod is fixedly connected to the sliding plate, the supporting shaft is rotatably connected to a surface of the sliding plate, one end of the supporting shaft away from the sliding plate is fixedly connected to the cylinder jaw mechanism, and the protrusive plate is fixedly connected to an exterior of the supporting shaft; the chute frame is fixedly connected to a surface of the mounting frame, the sliding wheel is rotatably connected to a surface of the protrusive plate close to the chute frame, and the sliding wheel is penetratingly mounted at an interior of the chute frame; the infrared sensor is mounted on an inner wall of the mounting frame, the worm gear is fixedly connected to a surface of the rotating shaft II penetrating through the conveying frame, the turning wheel I is fixedly connected to a surface of the rotating shaft I penetrating through the conveying frame, the worm rod is rotatably connected to a surface of the conveying frame, and the turning wheel II is fixedly connected to a surface of the worm rod.

Preferably, the sliding plate is slidably connected to the interior of the groove at the lower part of the mounting frame, the infrared sensor is electrically connected to the control module, and the turning wheel II is attached to an outer surface of the turning wheel I.

Preferably, the vehicle body correcting assembly includes a pulley shaft I, a pulley shaft II, and a belt; and the pulley shaft I and the pulley shaft II are rotatably connected to a top of an inner cavity of the mounting frame symmetrically, and outer walls of the pulley shaft I and the pulley shaft II are connected to the belt in a transmission way.

Preferably, the vehicle body correcting assembly further includes a bidirectional cam, transverse columns and auxiliary springs; and one end of the pulley shaft II is fixedly connected to the bidirectional cam, left and right cavity walls of the mounting frame are symmetrically penetrated by and slidably connected to the transverse columns, and an outer wall of the transverse column penetrating through one end of a side wall of the mounting frame is sleeved with the auxiliary spring.

Preferably, the vehicle body correcting assembly further includes rollers; and one end of the auxiliary spring is fixedly connected to the side wall of the mounting frame, the other end of the auxiliary spring is fixedly connected to the outer wall of the transverse column, and one end of the transverse column close to the bidirectional cam is connected to the roller.

Preferably, the vehicle body correcting assembly further includes bending slide rods and supporting connector plates; and a lower surface of the transverse column is fixedly connected to the bending slide rod, and the supporting connector plate is fixedly connected to one end of a side wall of the bending slide rod penetrating through the mounting frame.

Preferably, the vehicle body correcting assembly further includes side plates and spring-loaded telescopic pull rods; and the side plates are uniformly and fixedly connected to an outer wall of the supporting connector plate, and the spring-loaded telescopic pull rods are uniformly and fixedly connected to an inner wall of the side plate.

Preferably, the vehicle body correcting assembly further includes correcting plates and a limit telescopic rod; and one end of the spring-loaded telescopic pull rod is fixedly connected to the correcting plate, and an outer wall of the electric telescopic rod is fixedly connected to the limit telescopic rod.

Preferably, one end of the limit telescopic rod is fixedly connected to an outer surface of the belt.

The clamping device having an automatic direction adjustment function in a vehicle body welding conveying line provided by the present disclosure has the following advantageous effects:

The turning wheel I at one end of the rotating shaft I is meshed with the turning wheel II, so that the turning wheel I is attached to the turning wheel II to rotate with friction when the rotating shaft I and the turning wheel I rotate; and at this time, the turning wheel II is fixedly connected to the worm rod, and the worm rod is meshed with the worm gear, so that the worm gear and the rotating shaft II are synchronously driven to rotate, and the conveyor belt II is transmitted to move. Two sections of conveyor belts in different directions on the vehicle body conveying frame are transmitted through the driving motor, so that the indoor conveyor belts with right-angle settings can be adapted, and the electric power cost of starting a vehicle body conveying line traditionally using a plurality of driving motors is saved.

The sliding wheel on the protrusive plate is located at the interior of the chute frame, so that the sliding wheel at an upper part of the protrusive plate is pressed by the chute frame when the protrusive plate moves, and the protrusive plate is deflected by collision. Since the protrusive plate and the supporting shaft are fixedly connected, the supporting shaft and the cylinder jaw mechanism are synchronously driven to rotate, so that a clamped vehicle body can be rotated when moved to an upper part of the conveyor belt II. A head position of the vehicle body can be directed to a left side of the conveyor belt II by means of clamping and rotating, so that with regard to a turning conveying line, the purpose of adjusting a direction is achieved when the vehicle body is conveyed for welding, eliminating the step of adjusting the direction of the vehicle body during welding, and improving the working efficiency of the subsequent welding of the vehicle body.

A rotation angle of the sliding wheel and the protrusive plate is a rotation angle of the protrusive plate, the supporting shaft and the cylinder jaw mechanism controlled by a length of the chute frame. Aiming at different curved conveying lines, a retraction length of the electric telescopic rod can be controlled according to actual situations, so that rotation angles of the supporting shaft and the cylinder jaw mechanism can be controlled, which is suitable for conveying lines with different bending angles and improves the flexibility of the direction adjustment.

When the transverse columns slide, two supporting connector plates are pulled close to each other by the bending slide rods, and the plurality of spring-loaded telescopic pull rods and the correcting plates are driven close to each other, so that vehicle bodies being conveyed can be corrected to the same horizontal state, to avoid a situation where the clamping device on the conveying line cannot clamp inclined vehicle bodies because the vehicle bodies cannot be in the same horizontal plane when being put in, improving the accuracy of clamping, and ensuring that the vehicle bodies being conveyed do not have an offset inclination.

By arranging the plurality of spring-loaded telescopic pull rods on the side plates to cooperate with the correcting plates, the purpose of adapting to vehicle bodies with different shapes can be achieved when the correcting plates approach and touch the vehicle body to avoid damage to the vehicle body due to excessive strength of the correction.

Figure 1:
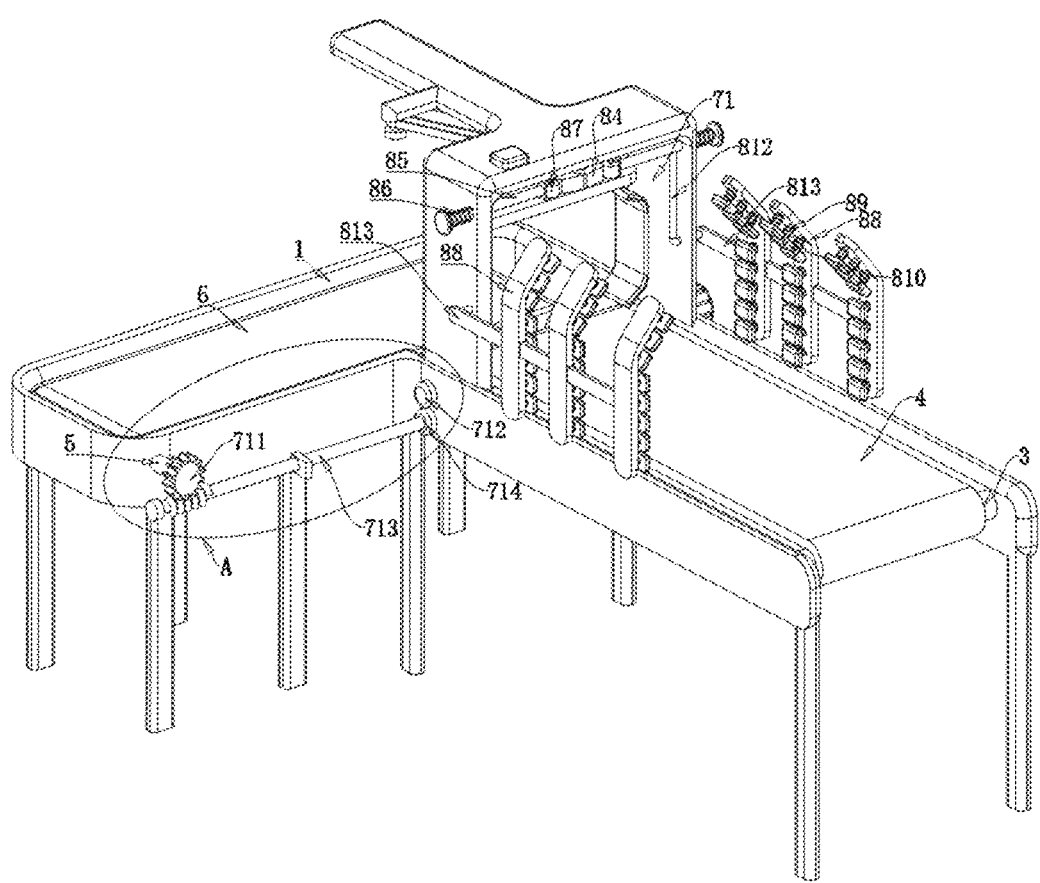
FIG. 1 is a schematic diagram of a three-dimensional structure according to the present disclosure.
Figure 2:
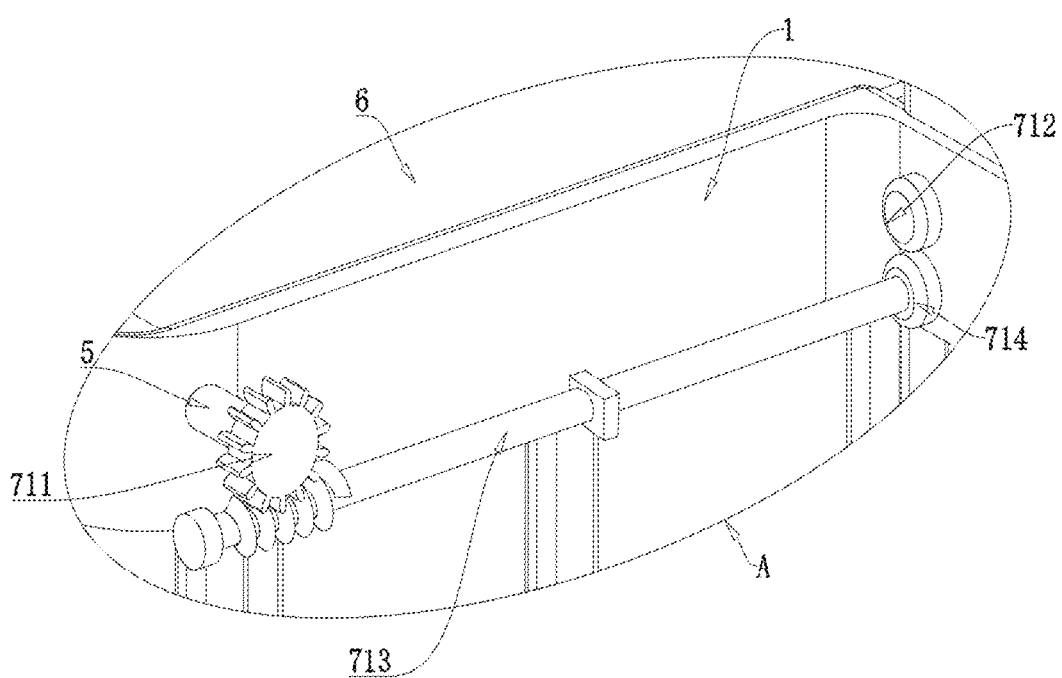
FIG. 2 is a schematic diagram of an enlarged structure of a region A in FIG. 1 according to the present disclosure.

Reference numerals and denotations thereof: 1—conveying frame; 2—driving motor; 3—rotating shaft I; 4—conveyor belt I; 5—rotating shaft II; 6—conveyor belt II; 71—mounting frame; 72—control module; 73—electric telescopic rod; 74—sliding plate; 75—supporting shaft; 76—cylinder jaw mechanism; 77—protrusive plate; 78—sliding wheel; 79—chute frame; 710—infrared sensor; 711—worm gear; 712—turning wheel I; 713—worm rod; and 714—turning wheel II; and 81—pulley shaft I; 82—pulley shaft II; 83—belt; 84—bi-directional cam; 85—transverse column; 86—auxiliary spring; 87—roller; 88—side plate; 89—spring-loaded telescopic pull rod; 810—correcting plate; 811—limit telescopic rod; 812—bending slide rod; and 813—supporting connector plate.

DETAILED DESCRIPTION

Technical solutions in examples of the present disclosure will be described clearly and completely in the following with reference to the attached drawings in the examples of the present disclosure. Obviously, all the described examples are only some, rather than all examples of the present disclosure. Based on the examples in the present disclosure, all other examples obtained by those of ordinary skill in the art without creative efforts belong to the scope of protection of the present disclosure.

The present disclosure provides the following technical solutions:

EXAMPLES

Figure 7:
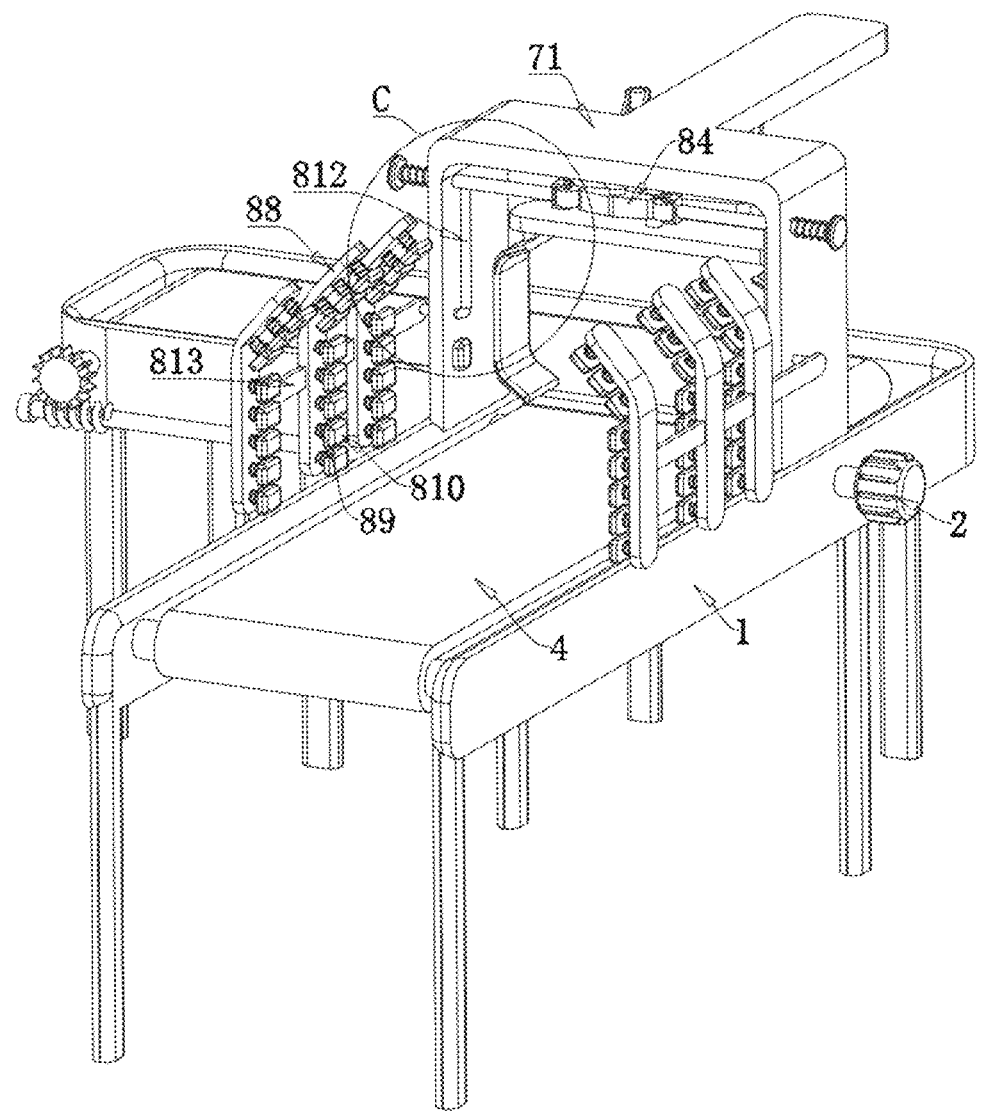
FIG. 7 is a schematic diagram of a mounting structure of a driving motor and a conveying frame according to the present disclosure.
Figure 8:
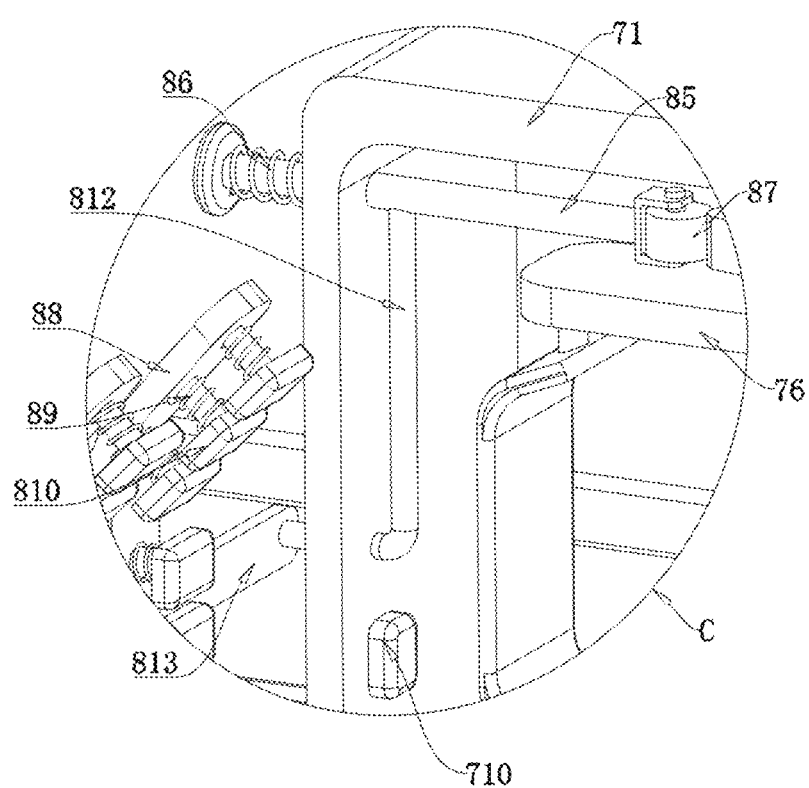
FIG. 8 is a schematic diagram of an enlarged structure of a region C in FIG. 7 according to the present disclosure.
Figure 9:
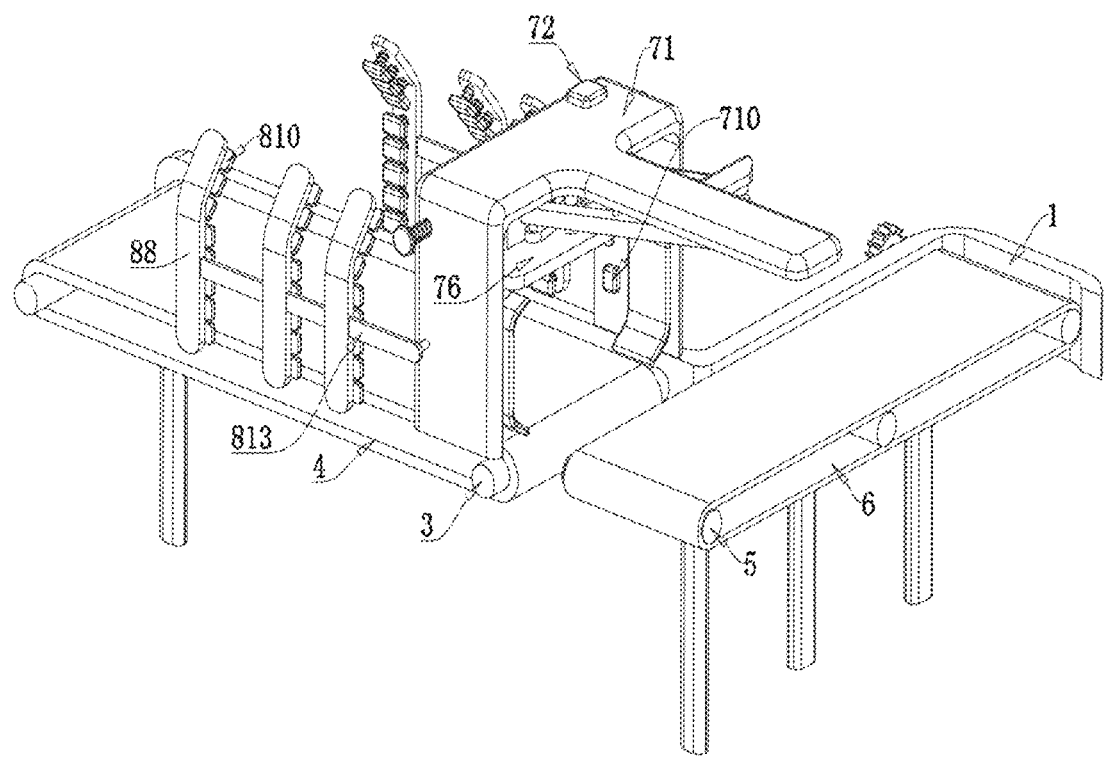
FIG. 9 is a schematic diagram of a mounting structure of a rotating shaft II and a conveyor belt II according to the present disclosure.
Figure 10:
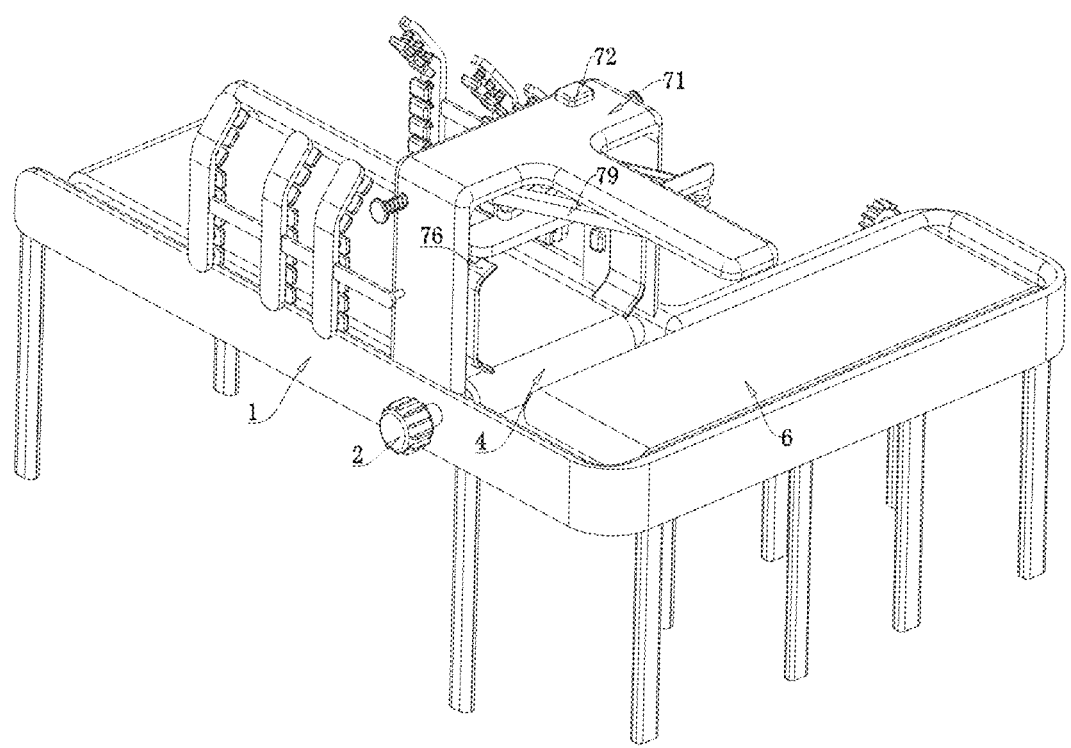
FIG. 10 is a schematic diagram of an overall mounting structure in a rear view according to the present disclosure.

Referring to FIGS. 1 and 7, a clamping device having an automatic direction adjustment function in a vehicle body welding conveying line includes a conveying frame 1. A driving motor 2 is fixedly connected to a side wall of the conveying frame 1, and rotating shafts I 3 are rotatably connected to an inner wall of the conveying frame 1 uniformly, an output shaft end of the driving motor 2 being fixedly connected to the rotating shaft I 3; and a conveyor belt I 4 is connected to outer walls of the rotating shafts I 3 in a transmission way, and rotating shafts II 5 are rotatably connected to the inner wall of the conveying frame 1 uniformly, a conveyor belt II 6 being connected to outer walls of the rotating shafts II 5 in a transmission way; and a direction self-adjustment assembly is mounted on the conveying frame 1, and a vehicle body correcting assembly is mounted on the conveying frame 1.

Referring to FIGS. 1-4 and 7-10, the direction self-adjustment assembly includes a mounting frame 71, a control module 72, an electric telescopic rod 73, a sliding plate 74, a supporting shaft 75, a cylinder jaw mechanism 76, a protrusive plate 77, a sliding wheel 78, a chute frame 79, an infrared sensor 710, a worm gear 711, a turning wheel I 712, a worm rod 713 and a turning wheel II 714; an upper part of the conveying frame 1 is fixedly connected to the mounting frame 71, an upper part of the mounting frame 71 is fixedly mounted with the control module 72, and the electric telescopic rod 73 is fixedly connected to an interior of a groove at a lower part of the mounting frame 71; one end of the electric telescopic rod 73 is fixedly connected to the sliding plate 74, the supporting shaft 75 is rotatably connected to a surface of the sliding plate 74, one end of the supporting shaft 75 away from the sliding plate 74 is fixedly connected to the cylinder jaw mechanism 76, and the protrusive plate 77 is fixedly connected to an exterior of the supporting shaft 75; the chute frame 79 is fixedly connected to a surface of the mounting frame 71, the sliding wheel 78 is rotatably connected to a surface of the protrusive plate 77 close to the chute frame 79, and the sliding wheel 78 is penetratingly mounted at an interior of the chute frame 79; the infrared sensor 710 is mounted on an inner wall of the mounting frame 71, the worm gear 711 is fixedly connected to a surface of the rotating shaft II 5 penetrating through the conveying frame 1, the turning wheel I 712 is fixedly connected to a surface of the rotating shaft I 3 penetrating through the conveying frame 1, the worm rod 713 is rotatably connected to a surface of the conveying frame 1, and the turning wheel II 714 is fixedly connected to a surface of the worm rod 713. The sliding plate 74 is slidably connected to the interior of the groove at the lower part of the mounting frame 71, the infrared sensor 710 is electrically connected to the control module 72, and the turning wheel II 714 is attached to an outer surface of the turning wheel I 712. Two opposite telescopic cylinders are arranged on the cylinder jaw mechanism 76, and jaws are mounted at two ends of the telescopic cylinder. The control module 72 controls the movement of the telescopic cylinders by controlling an electromagnetic valve. Specifically, the telescopic cylinder is connected to an air pump through an air pipe, and the electromagnetic valve is mounted on the air pipe. The connection structure here belongs to the prior art, and will not be elaborated here.

Figure 3:
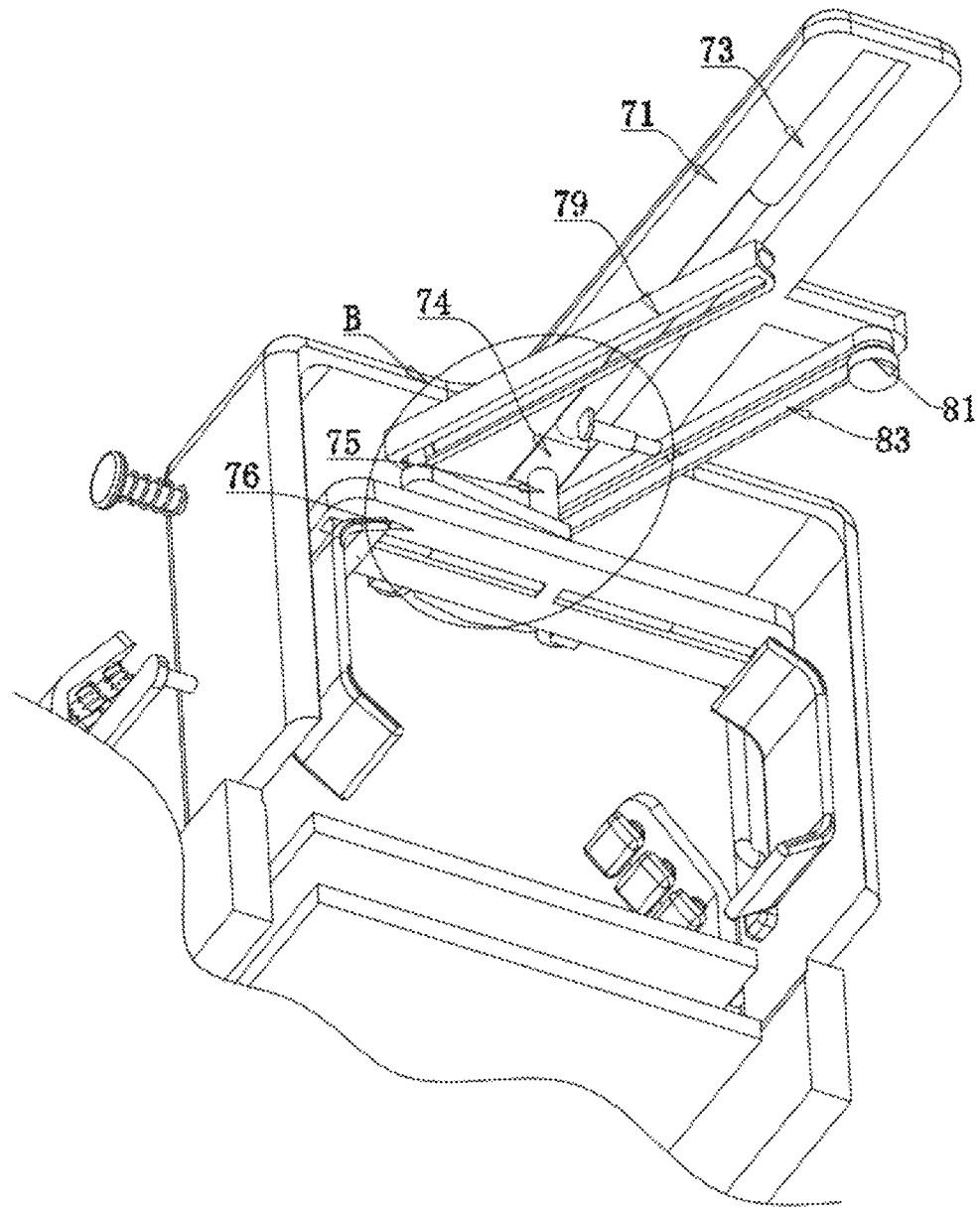
FIG. 3 is a schematic diagram of a mounting structure of a mounting frame and an electric telescopic rod according to the present disclosure.
Figure 4:
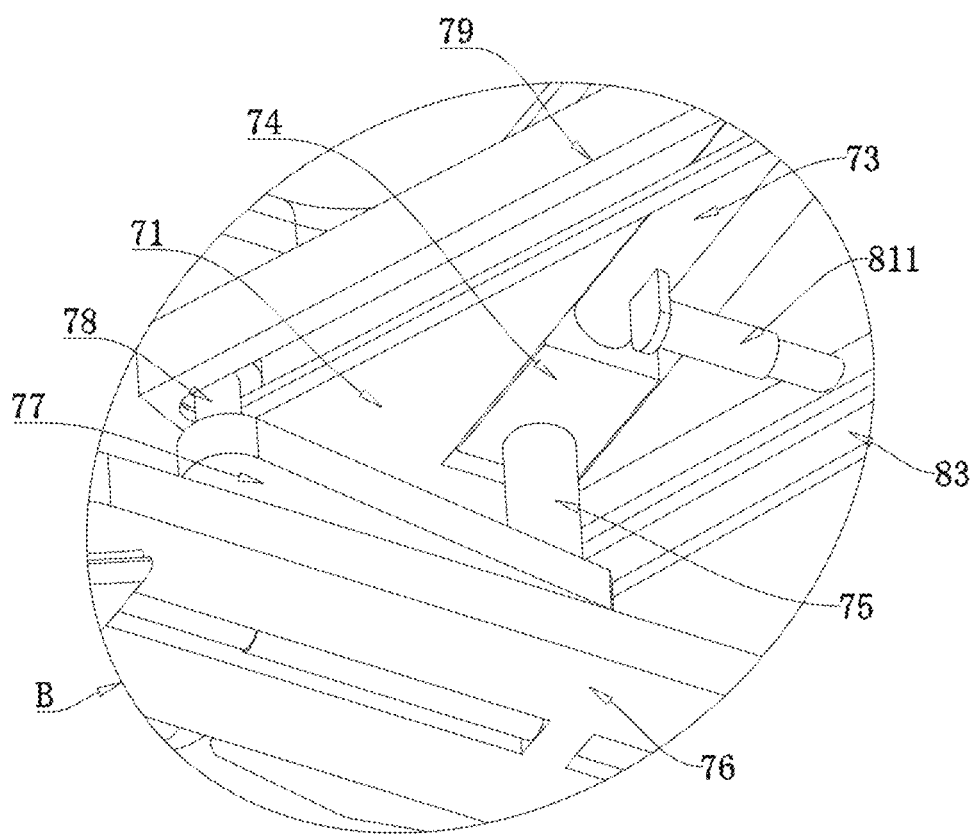
FIG. 4 is a schematic diagram of an enlarged structure of a region B in FIG. 3 according to the present disclosure.
Figure 5:
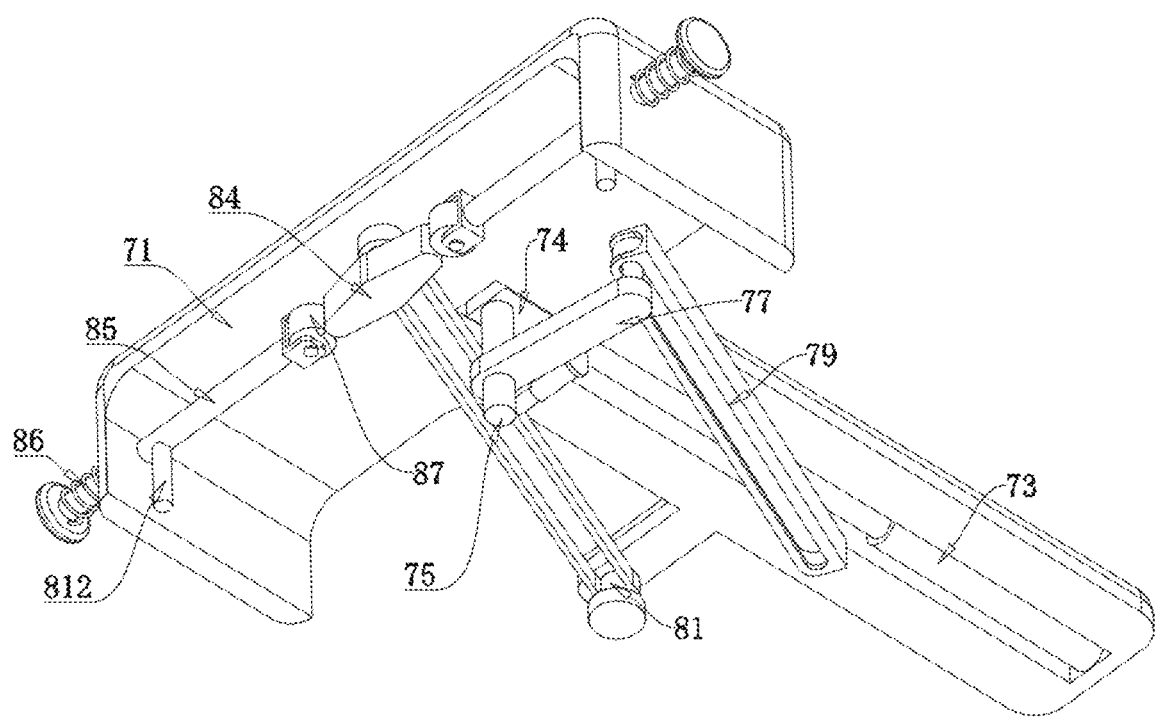
FIG. 5 is a schematic diagram of a mounting structure of a supporting shaft and a protrusive plate according to the present disclosure.
Figure 6:
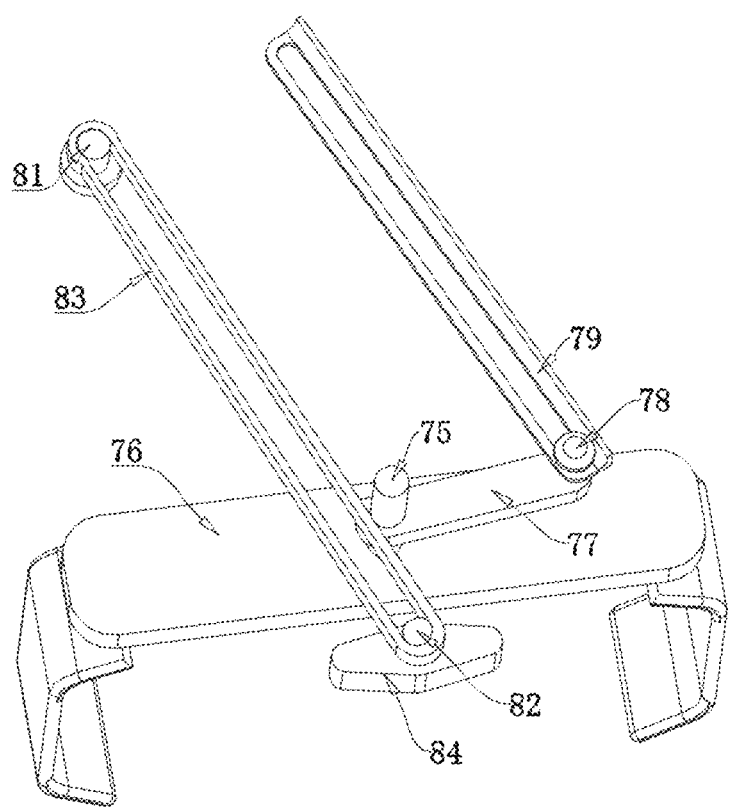
FIG. 6 is a schematic diagram of a mounting structure of a pulley shaft II and a bidirectional cam according to the present disclosure.

Referring to FIGS. 3, 5 and 6, the vehicle body correcting assembly includes a pulley shaft I 81, a pulley shaft II 82, and a belt 83; and the pulley shaft I 81 and the pulley shaft II 82 are rotatably connected to a top of an inner cavity of the mounting frame 71 symmetrically, and outer walls of the pulley shaft I 81 and the pulley shaft II 82 are connected to the belt 83 in a transmission way. The vehicle body correcting assembly further includes a bidirectional cam 84, transverse columns 85 and auxiliary springs 86; and one end of the pulley shaft II 82 is fixedly connected to the bidirectional cam 84, left and right cavity walls of the mounting frame 71 are symmetrically penetrated by and slidably connected to the transverse columns 85, and an outer wall of the transverse column 85 penetrating through one end of a side wall of the mounting frame 71 is sleeved with the auxiliary spring 86. When the bidirectional cam 84 rotates to a vertical state, the rollers 87 will always be attached to the outer wall of the bidirectional cam 84.

Referring to FIGS. 5 and 7, the vehicle body correcting assembly further includes rollers 87; and one end of the auxiliary spring 86 is fixedly connected to the side wall of the mounting frame 71, the other end of the auxiliary spring 86 is fixedly connected to the outer wall of the transverse column 85, and one end of the transverse column 85 close to the bidirectional cam 84 is connected to the roller 87. The vehicle body correcting assembly further includes bending slide rods 812 and supporting connector plates 813; and a lower surface of the transverse column 85 is fixedly connected to the bending slide rod 812, and the supporting connector plate 813 is fixedly connected to one end of a side wall of the bending slide rod 812 penetrating through the mounting frame 71. The bending slide rod 812 penetrates through and is slidably connected to the inner wall of the mounting frame 71, and can provide support force for the supporting connector plate 813.

Referring to FIGS. 3, 4, 7 and 8, the vehicle body correcting assembly further includes side plates 88 and spring-loaded telescopic pull rods 89; and the side plates 88 are uniformly and fixedly connected to an outer wall of the supporting connector plate 813, and the spring-loaded telescopic pull rods 89 are uniformly and fixedly connected to an inner wall of the side plate 88. The vehicle body correcting assembly further includes correcting plates 810 and a limit telescopic rod 811; and one end of the spring-loaded telescopic pull rod 89 is fixedly connected to the correcting plate 810, and an outer wall of the electric telescopic rod 73 is fixedly connected to the limit telescopic rod 811. One end of the limit telescopic rod 811 is fixedly connected to an outer surface of the belt 83. When the limit telescopic rod 811 moves with the electric telescopic rod 73, the belt 83 is arranged obliquely, so the limit telescopic rod 811 will contract or lengthen when moving.

All working processes and working principles of the above-mentioned examples are described below:

Initial state: referring to FIGS. 1 and 5, since the two ends of the bidirectional cam 84 abut against two rollers 87, the two rollers 87 and the transverse columns 85 are in a state of being pressed away from each other, thus pulling the auxiliary springs 86 of the outer walls of the transverse columns 85 to stretch.

During operation: a vehicle body needing to be welded and transmitted is placed on an upper part of the conveyor belt I 4, and the driving motor 2 is started to drive the rotating shaft I 3 to rotate, driving the conveyor belt I 4 to move in a direction of the conveyor belt II 6. The turning wheel I 712 at one end of the rotating shaft I 3 is meshed with the turning wheel II 714, so that the turning wheel I 712 is attached to the turning wheel II 714 to rotate with friction when the rotating shaft I 3 and the turning wheel I 712 rotate; and at this time, the turning wheel II 714 is fixedly connected to the worm rod 713, and the worm rod 713 is meshed with the worm gear 711, so that the worm gear 711 and the rotating shaft II 5 are synchronously driven to rotate, and the conveyor belt II 6 is transmitted to move. Two sections of conveyor belts in different directions on the vehicle body conveying frame 1 are transmitted through one driving motor 2, so that the indoor conveyor belts with right-angle settings can be adapted, and the electric power cost of starting a vehicle body conveying line traditionally using a plurality of driving motors 2 is saved.

Further, when the vehicle body on the conveyor belt I 4 is transmitted to be close to the mounting frame 71, the infrared sensor 710 mounted in the inner cavity of the mounting frame 71 senses the vehicle body to transmit a signal to the control module 72, so that the control module 72 activates the electromagnetic valve to control the telescopic cylinders on the cylinder jaw mechanism 76 to contract, to drive two jaws to clamp the vehicle body. The electric telescopic rod 73 is activated to pull the sliding plate 74 to move towards a direction close to the pulley shaft I 81. In addition, the supporting shaft 75, the cylinder jaw mechanism 76 and the clamped vehicle body are pulled to move towards a direction of the pulley shaft I 81 synchronously, and at this time, the protrusive plate 77 is driven to move synchronously. The sliding wheel 78 on the protrusive plate 77 is located at the interior of the chute frame 79, so that the sliding wheel 78 at an upper part of the protrusive plate 77 is pressed by the chute frame 79 when the protrusive plate 77 moves, and the protrusive plate 77 is deflected by collision. Since the protrusive plate 77 and the supporting shaft 75 are fixedly connected, the supporting shaft 75 and the cylinder jaw mechanism 76 are synchronously driven to rotate, so that a clamped vehicle body can be rotated when moved to an upper part of the conveyor belt II 6. A head position of the vehicle body can be directed to a left side of the conveyor belt II 6 by means of clamping and rotating, so that with regard to a turning conveying line, the purpose of adjusting a direction is achieved when the vehicle body is conveyed for welding, eliminating the step of adjusting the direction of the vehicle body during welding, and improving the working efficiency of the subsequent welding of the vehicle body.

It is to be noted that a rotation angle of the sliding wheel 78 and the protrusive plate 77 is a rotation angle of the protrusive plate 77, the supporting shaft 75 and the cylinder jaw mechanism 76 controlled by a length of the chute frame 79. Aiming at different curved conveying lines, a stretch length of the electric telescopic rod 73 can be controlled according to actual situations, so that rotation angles of the supporting shaft 75 and the cylinder jaw mechanism 76 can be controlled, which is suitable for conveying lines with different bending angles and improves the flexibility of the direction adjustment.

Furthermore, since an outer part of the electric telescopic rod 73 is fixedly connected to the limit telescopic rod 811, and one end of the limit telescopic rod 811 is fixedly connected to the outer wall of the belt 83, as the electric telescopic rod 73 contracts, the limit telescopic rod 811 is synchronously pulled to move towards a direction of the pulley shaft I 81, and the belt 83 is also driven to move; and in this way, the belt 83 drives the pulley shaft II 82 and the bidirectional cam 84 rotate synchronously with friction, and when the bidirectional cam 84 rotates, two ends of the bidirectional cam 84 no longer press against the two rollers 87. At this time, the originally compressed auxiliary springs 86 will reset and rebound, the two transverse columns 85 are pulled close to each other on the inner wall of the mounting frame 71, so that the rollers 87 are always attached to the outer surface of the bidirectional cam 84. When the transverse columns 85 slide, two supporting connector plates 813 are pulled close to each other by the bending slide rods 812, and the plurality of spring-loaded telescopic pull rods 89 and the correcting plates 810 are driven close to each other, so that vehicle bodies being conveyed can be corrected to the same horizontal state, to avoid a situation where the clamping device on the conveying line cannot clamp inclined vehicle bodies because the vehicle bodies cannot be in the same horizontal plane when being put in, improving the accuracy of clamping, and ensuring that the vehicle bodies being conveyed do not have an offset inclination.

Moreover, by arranging the plurality of spring-loaded telescopic pull rods 89 on the side plates 88 to cooperate with the correcting plates 810, the purpose of adapting to vehicle bodies with different shapes can be achieved when the correcting plates 810 approach and touch the vehicle body to avoid damage to the vehicle body due to excessive approaching strength of the correction.

While examples of the present disclosure have been shown and described, it will be understood by those skilled in the art that various changes, modifications, substitutions and alterations may be made herein without departing from the principles and spirit of the present disclosure, the scope of which is defined by the appended claims and equivalents thereof.

The invention claimed is:

1. A clamping device having an automatic direction adjustment function in a vehicle body welding conveying line, comprising a conveying frame (1), wherein a driving motor (2) is fixedly connected to a side wall of the conveying frame (1), and rotating shafts I (3) are rotatably connected to an inner wall of the conveying frame (1) uniformly, an output shaft end of the driving motor (2) being fixedly connected to the rotating shaft I (3); and a conveyor belt I (4) is connected to outer walls of the rotating shafts I (3) in a transmission way, and rotating shafts II (5) are rotatably connected to the inner wall of the conveying frame (1) uniformly, a conveyor belt II (6) being connected to outer walls of the rotating shafts II (5) in a transmission way; and a direction self-adjustment assembly is mounted on the conveying frame (1), and a vehicle body correcting assembly is mounted on the conveying frame (1); and the direction self-adjustment assembly comprises a mounting frame (71), a control module (72), an electric telescopic rod (73), a sliding plate (74), a supporting shaft (75), a cylinder jaw mechanism (76), a protrusive plate (77), a sliding wheel (78), a chute frame (79), an infrared sensor (710), a worm gear (711), a turning wheel I (712), a worm rod (713) and a turning wheel II (714); an upper part of the conveying frame (1) is fixedly connected to the mounting frame (71), an upper part of the mounting frame (71) is fixedly mounted with the control module (72), and the electric telescopic rod (73) is fixedly connected to an interior of a groove at a lower part of the mounting frame (71); one end of the electric telescopic rod (73) is fixedly connected to the sliding plate (74), the supporting shaft (75) is rotatably connected to a surface of the sliding plate (74), one end of the supporting shaft (75) away from the sliding plate (74) is fixedly connected to the cylinder jaw mechanism (76), and the protrusive plate (77) is fixedly connected to an exterior of the supporting shaft (75); the chute frame (79) is fixedly connected to a surface of the mounting frame (71), the sliding wheel (78) is rotatably connected to a surface of the protrusive plate (77) close to the chute frame (79), and the sliding wheel (78) is penetratingly mounted at an interior of the chute frame (79); the infrared sensor (710) is mounted on an inner wall of the mounting frame (71), the worm gear (711) is fixedly connected to a surface of the rotating shaft II (5) penetrating through the conveying frame (1), the turning wheel I (712) is fixedly connected to a surface of the rotating shaft I (3) penetrating through the conveying frame (1), the worm rod (713) is rotatably connected to a surface of the conveying frame (1), and the turning wheel II (714) is fixedly connected to a surface of the worm rod (713).

2. The clamping device having an automatic direction adjustment function in a vehicle body welding conveying line according to claim 1, wherein the sliding plate (74) is slidably connected to the interior of the groove at the lower part of the mounting frame (71), the infrared sensor (710) is electrically connected to the control module (72), and the turning wheel II (714) is attached to an outer surface of the turning wheel I (712).

3. The clamping device having an automatic direction adjustment function in a vehicle body welding conveying line according to claim 1, wherein the vehicle body correcting assembly comprises a pulley shaft I (81), a pulley shaft II (82), and a belt (83); and the pulley shaft I (81) and the pulley shaft II (82) are rotatably connected to a top of an inner cavity of the mounting frame (71) symmetrically, and outer walls of the pulley shaft I (81) and the pulley shaft II (82) are connected to the belt (83) in a transmission way.

4. The clamping device having an automatic direction adjustment function in a vehicle body welding conveying line according to claim 3, wherein the vehicle body correcting assembly further comprises a bidirectional cam (84), transverse columns (85) and auxiliary springs (86); and one end of the pulley shaft II (82) is fixedly connected to the bidirectional cam (84), left and right cavity walls of the mounting frame (71) are symmetrically penetrated by and slidably connected to the transverse columns (85), and an outer wall of the transverse column (85) penetrating through one end of a side wall of the mounting frame (71) is sleeved with the auxiliary spring (86).

5. The clamping device having an automatic direction adjustment function in a vehicle body welding conveying line according to claim 4, wherein the vehicle body correcting assembly further comprises rollers (87); and one end of the auxiliary spring (86) is fixedly connected to the side wall of the mounting frame (71), the other end of the auxiliary spring (86) is fixedly connected to the outer wall of the transverse column (85), and one end of the transverse column (85) close to the bidirectional cam (84) is connected to the roller (87).

6. The clamping device having an automatic direction adjustment function in a vehicle body welding conveying line according to claim 5, wherein the vehicle body correcting assembly further comprises bending slide rods (812) and supporting connector plates (813); and a lower surface of the transverse column (85) is fixedly connected to the bending slide rod (812), and the supporting connector plate (813) is fixedly connected to one end of a side wall of the bending slide rod (812) penetrating through the mounting frame (71).

7. The clamping device having an automatic direction adjustment function in a vehicle body welding conveying line according to claim 6, wherein the vehicle body correcting assembly further comprises side plates (88) and spring-loaded telescopic pull rods (89); and the side plates (88) are uniformly and fixedly connected to an outer wall of the supporting connector plate (813), and the spring-loaded telescopic pull rods (89) are uniformly and fixedly connected to an inner wall of the side plate (88).

8. The clamping device having an automatic direction adjustment function in a vehicle body welding conveying line according to claim 7, wherein the vehicle body correcting assembly further comprises correcting plates (810) and a limit telescopic rod (811); and one end of the spring-loaded telescopic pull rod (89) is fixedly connected to the correcting plate (810), and an outer wall of the electric telescopic rod (73) is fixedly connected to the limit telescopic rod (811).

9. The clamping device having an automatic direction adjustment function in a vehicle body welding conveying line according to claim 8, wherein one end of the limit telescopic rod (811) is fixedly connected to an outer surface of the belt (83).

* * * * *